(12) United States Patent
Kim (10) Patent No.: US 11,874,979 B2
(45) Date of Patent: Jan. 16, 2024

(54) PROJECTION SWITCHING DEVICE

(71) Applicant: HYUNDAI MOBIS CO., LTD., Seoul (KR)

(72) Inventor: Won Sik Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/502,704

(22) Filed: Oct. 15, 2021

(65) Prior Publication Data

US 2022/0121297 A1 Apr. 21, 2022

(30) Foreign Application Priority Data

Oct. 15, 2020 (KR) ........................ 10-2020-0133668

(51) Int. Cl.
*G06F 3/041* (2006.01)
*G09G 3/00* (2006.01)

(52) U.S. Cl.
CPC ............. *G06F 3/041* (2013.01); *G09G 3/001* (2013.01); *G09G 2340/0464* (2013.01); *G09G 2354/00* (2013.01); *G09G 2380/10* (2013.01)

(58) Field of Classification Search
CPC ........ G06F 3/041; G06F 3/042; G06F 3/0416; G09G 3/001; G09G 2340/0464; G09G 2354/00; G09G 2380/10; B60K 2370/1438; B60K 2370/1442; B60K 2370/334; B60K 2370/52; B60K 2370/67; B60K 2370/744; B60K 2370/92; B60K 37/06; B60K 35/00; B60K 2370/1434; B60K 2370/143; B60K 2370/167; B60K 2370/152; B60K 2370/81; B60R 16/005; B60R 16/02; G09F 9/405; G09F 13/22
See application file for complete search history.

(56) References Cited

U.S. PATENT DOCUMENTS

| | | | |
|---|---|---|---|
| 6,353,434 B1 * | 3/2002 | Akebi .................... | G06F 3/0418 345/173 |
| 6,747,636 B2 * | 6/2004 | Martin .................. | G06F 3/0418 345/173 |
| 7,256,772 B2 * | 8/2007 | Morrison .............. | G06F 3/0428 345/178 |
| 8,451,381 B2 * | 5/2013 | Kaise .................. | H04N 21/4221 348/580 |
| 8,749,530 B2 * | 6/2014 | Wang ...................... | G06F 3/042 178/18.09 |

(Continued)

FOREIGN PATENT DOCUMENTS

CN 105446524 A 3/2016
CN 111148649 A 5/2020
(Continued)

*Primary Examiner* — Temesghen Ghebretinsae
*Assistant Examiner* — K. Kiyabu
(74) *Attorney, Agent, or Firm* — NSIP Law (57) ABSTRACT

Disclose are projection switching devices including a projection configured to project a symbol on a lower garnish, the lower garnish configured to cover a lower dashboard and to display control information projected from the projection, touch sensors disposed on a lower portion of the lower garnish to sense a touch of a user, and a controller configured to output control information corresponding to symbol information at a position where the touch has occurred to a corresponding device, in response to the touch being sensed by the touch sensor.

10 Claims, 9 Drawing Sheets

(56) References Cited

U.S. PATENT DOCUMENTS

| | | | |
|---|---|---|---|
| 9,104,264 B2* | 8/2015 | Iida | |
| 10,664,100 B2* | 5/2020 | Tang | G06F 3/0488 |
| 11,173,787 B2 | 11/2021 | Vai et al. | |
| 2003/0189675 A1* | 10/2003 | Itaki | H04N 3/2335 |
| | | | 348/189 |
| 2003/0210381 A1* | 11/2003 | Itaki | H04N 5/74 |
| | | | 353/70 |
| 2005/0073661 A1* | 4/2005 | Tamura | H04N 9/3194 |
| | | | 353/70 |
| 2011/0234994 A1* | 9/2011 | Uchiyama | H04N 9/3185 |
| | | | 353/121 |
| 2016/0085332 A1 | 3/2016 | Herrera-Morales et al. | |
| 2016/0316186 A1* | 10/2016 | Krishnakumar | G06F 1/325 |
| 2017/0347079 A1* | 11/2017 | Wang | H04N 9/3188 |
| 2019/0219907 A1* | 7/2019 | Kurota | G06F 3/0484 |
| 2020/0007835 A1* | 1/2020 | Ichieda | H04N 9/3191 |
| 2020/0108679 A1* | 4/2020 | Golgiri | B60K 35/00 |
| 2020/0192466 A1 | 6/2020 | Vai et al. | |
| 2021/0086617 A1* | 3/2021 | Jeon | B60K 37/06 |

FOREIGN PATENT DOCUMENTS

| | | |
|---|---|---|
| DE | 10 2018 009 543 A1 | 6/2019 |
| DE | 10 2019 200 632 A1 | 7/2020 |
| JP | 2015-85807 A | 5/2015 |
| KR | 20120017689 A * | 2/2012 |

\* cited by examiner

PROJECTION SWITCHING DEVICE

CROSS-REFERENCE TO RELATED APPLICATION

This application claims the benefit under 35 USC § 119(a) of Korean Patent Application No. 10-2020-0133668, filed on Oct. 15, 2020, the entire disclosure of which is incorporated herein by reference for all purposes.

BACKGROUND

1. Field

The following description relates to a projection switching device, and more particularly, to a switching device providing a touch switch inside a vehicle.

2. Discussion of Related Art

Generally, a center fascia which displays Audio Video Navigation (AVN) functions, navigation functions, and air conditioning control functions of a vehicle to a driver to allow the driver to control such functions is mounted in a fixed state on a dashboard of the vehicle.

In a conventional dashboard, an operation switch is provided as a backlight type on a lower portion of the dashboard, and since a switch symbol is implemented through masking, there are problems in that it is not possible to change the shape and a limitation occurs in surface treatment for visibility of an image projected by the backlight.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a projection switching device including a projection configured to project a symbol on a lower garnish, the lower garnish configured to cover a lower dashboard and to display control information projected from the projection, touch sensors disposed on a lower portion of the lower garnish to sense a touch of a user, and a controller configured to output control information corresponding to symbol information at a position where the touch has occurred to a corresponding device, in response to the touch being sensed by the touch sensor.

The projection may be disposed at an inner side of an upper dashboard.

The projection switching device may include a reference position provider configured to project a position correcting symbol on the lower garnish, wherein the controller may be configured to adjust a variation in a projected image using a keystone adjustment function of the projection.

The reference position provider may include a projection area disposed at a side of the lower garnish and is further configured to display a correcting symbol on the lower garnish through a backlight.

The reference position provider may be configured to display a correcting symbol through a light emitting diode (LED) disposed on the lower garnish.

The touch sensors may constitute a single touchpad comprising a plurality of touch areas.

In response to correcting a variation in the projection area, the controller may be configured to switch to a variation adjustment mode for position correction of a projected image that is output from the projection, to project the correcting symbol for position correction from the projection on to the lower garnish, and to enable the position of the projected image to be adjusted according to a touch of the user.

The projection may be configured to not be exposed to a gaze of the user.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The same name may be used to describe an element included in the examples described above and an element having a common function. Unless otherwise mentioned, the descriptions on the examples may be applicable to the following examples and thus, duplicated descriptions will be omitted for conciseness.

Figure 1:
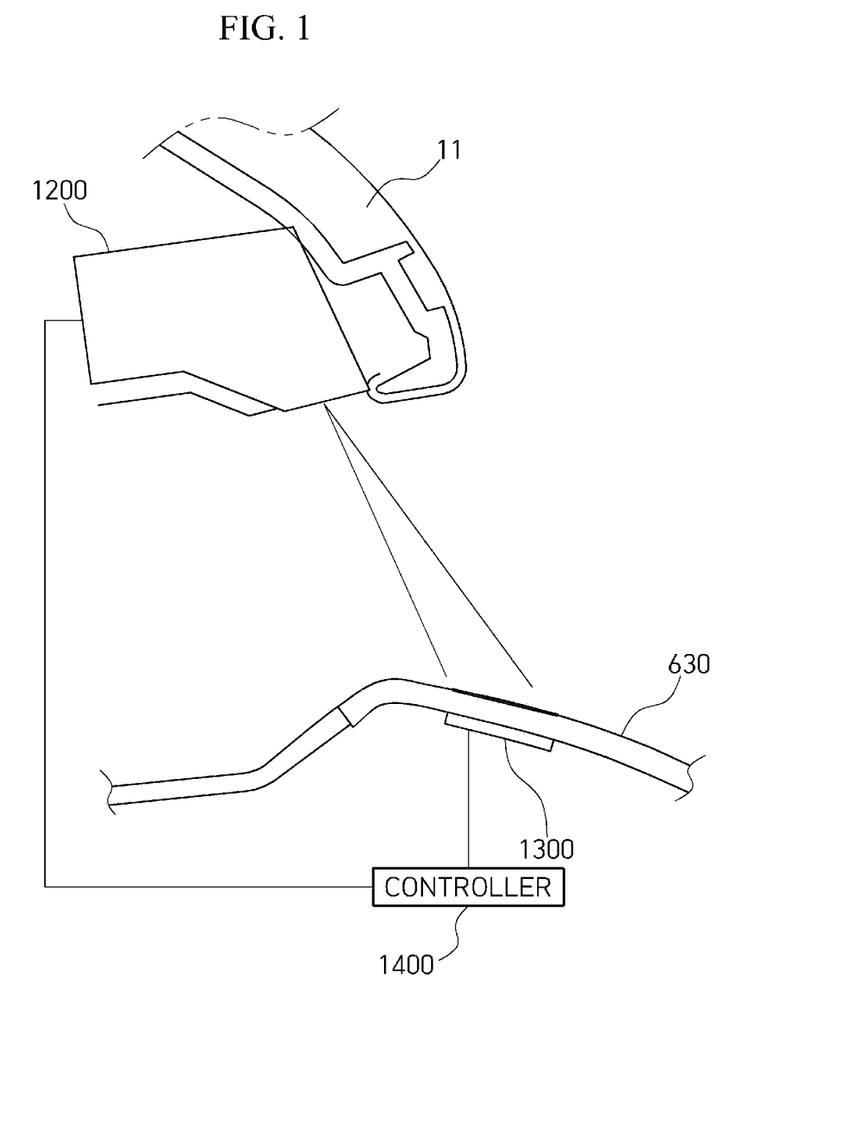
FIG. 1 is a view for describing a projection switching device according to an embodiment.

FIG. 1 is a view for describing a projection switching device according to a first embodiment of the present invention.

As illustrated in FIG. 1, in order to secure a degree of freedom of surface treatment on a switch disposed in a dashboard of a vehicle and diversify implemented images, the projection switching device according to the first embodiment of the present invention includes a projection 1200, a plurality of touch sensors 1300, and a controller 1400. Preferably, a microcontroller unit (MCU) of the vehicle may be used as the controller 1400 in the first embodiment of the present invention, but the controller 1400 is not limited thereto, and a separate digital signal processor (DSP) may also be used as the controller 1400.

The projection 1200 projects a symbol on a lower garnish 630. Meanwhile, preferably, the projection 1200 may be disposed at an inner side of an upper dashboard 11 so as not to be exposed to a gaze of a driver.

Also, the lower garnish 630 covers a lower dashboard 13 and displays control information output from the projection 1200.

The plurality of touch sensors 1300 are disposed on a lower portion of the lower garnish 630 to sense a touch by a user.

When the user's touch sensed by the touch sensor 1300 and symbol information projected through the projection 1200 are input, the controller 1400 outputs control information that corresponds to information on the user's touch to the corresponding device.

Also, in the first embodiment of the present invention, the projection switching device further includes a reference position providing portion 1500 (may also be referred to as reference position provider) configured to project a position correcting symbol on the lower garnish 630. Here, the reference position providing portion 1500 may have a projection area disposed at one side of the lower garnish 630 and may display a position correcting symbol on the lower garnish 630 through a backlight 1510 of the reference position providing portion 1500. Meanwhile, the reference position providing portion 1500 may also be representative of a light emitting diode (LED) to display the position correcting symbol through the lower garnish 630, such as at the positions corresponding by the illustrated position correcting symbols 1600 in FIG. 4 corresponding to the reference position providing portion 1500 of FIG. 6.

In an example, the reference position providing portion 1500 may be representative of a microcontroller unit (MCU) of the vehicle to control the display of the position correcting symbol, but the reference position providing portion 1500 is not limited thereto. The reference position providing portion 1500 may also be include a separate digital signal processor (DSP). In another example, a separate digital signal processor (DSP) may also be used for both the controller 1400 and the control of the display of the position correcting symbol.

Thus, preferably, the controller 1400 may allow a user to adjust a variation in a projected image using a keystone adjustment function of the projection 1200.

The plurality of touch sensors 1300 may also be a single touchpad having a plurality of touch areas.

According to the first embodiment of the present invention, by implementing the projection 1200-type switch, usability of the device can be improved, and an error rate of the device can be reduced through position correction.

Hereinafter, an operational process of the projection switching device according to the first embodiment of the present invention will be described with reference to FIGS. 2 to 10.

When the power of the vehicle is turned on, the controller 1400 controls the output of the projection 1200 so that default symbol information is output on the lower garnish 630.

Figure 2:
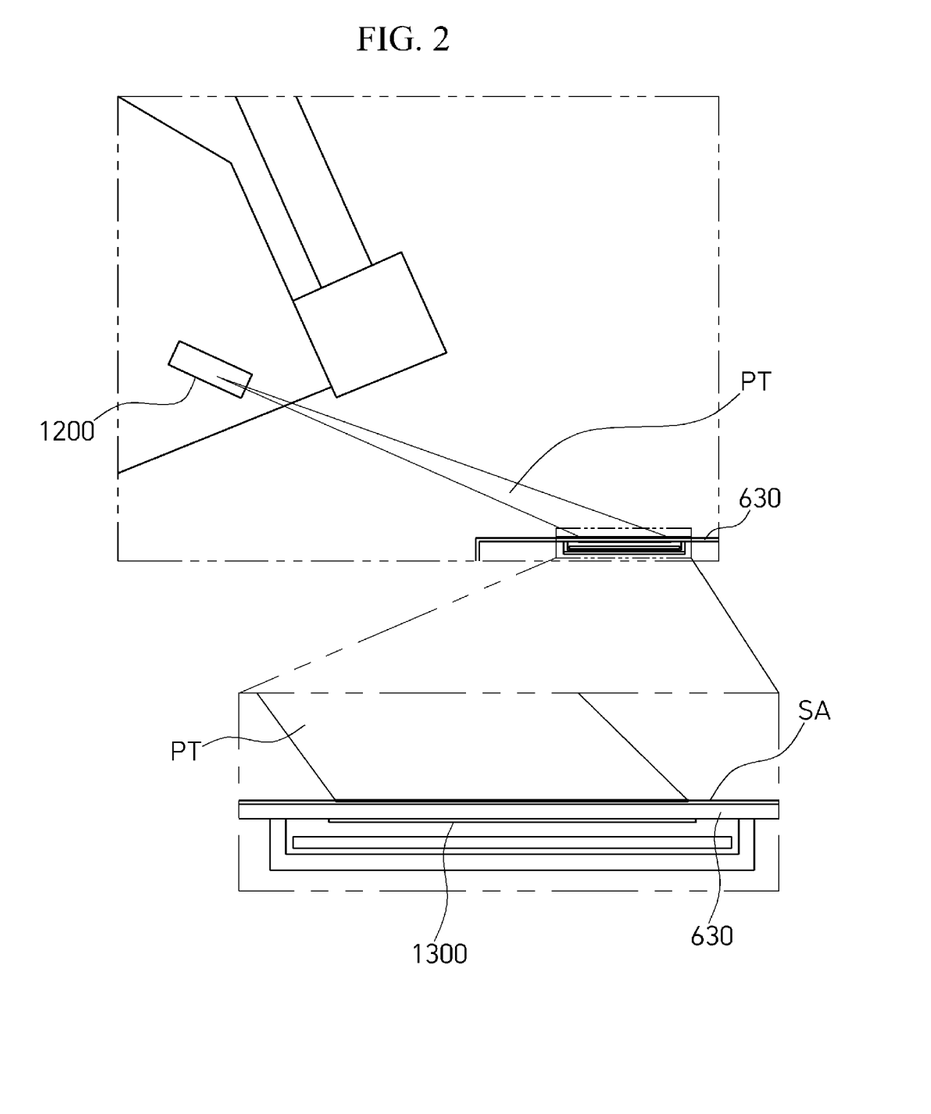
FIGS. 2 to 6 are reference diagrams for describing an operational process of the projection switching device according to an embodiment.
Figure 3:
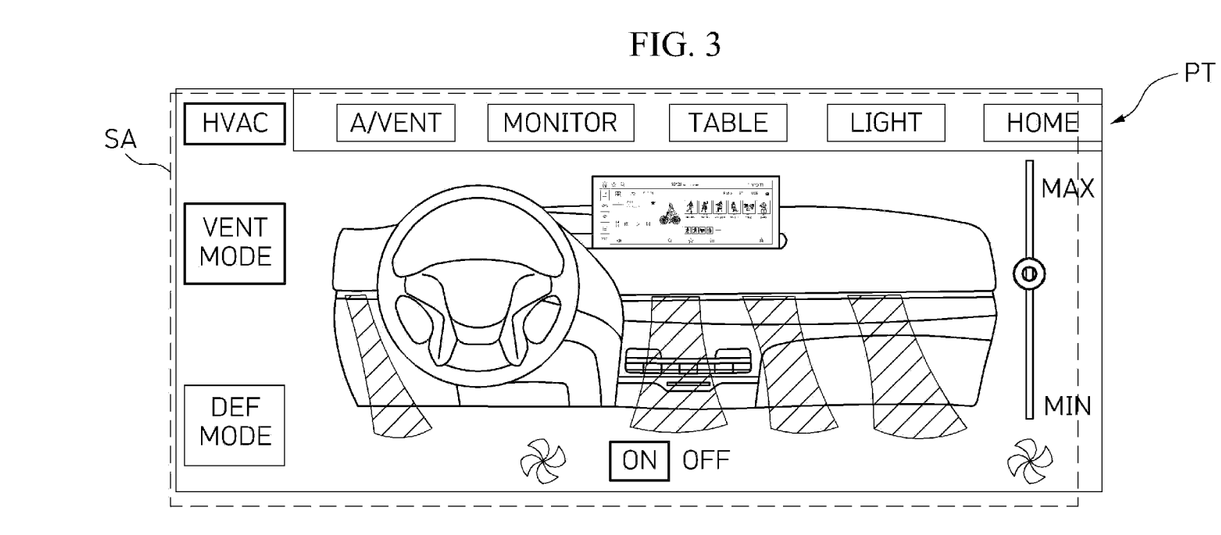

Then, as illustrated in FIG. 2, the projection 1200 projects a symbol set by the controller 1400 on the lower garnish 630. As illustrated in FIG. 3, a menu such as A/VENT, MONITOR, TABLE, LIGHT, and HOME and symbols such as VENT MODE, DEF MODE, on/off of an air conditioning system, and an air conditioning strength control bar (maximum, minimum) are projected on the lower garnish 630. FIG. 3 is only an embodiment, and the symbols are not limited thereto.

The touch sensors 1300 configured to recognize the user's touch are installed on lower portions of the symbols projected on the lower garnish 630.

When the driver or passenger touches a projected symbol, the touch sensor 1300 installed on the lower portion of the lower garnish 630 recognizes the user's touch and provides the information to the controller 1400.

Then, the controller 1400 checks information on the user's touch sensed by the touch sensor 1300 and information on the symbol projected through the projection 1200 and provides control information corresponding to the touch information to the corresponding device.

Figure 4:
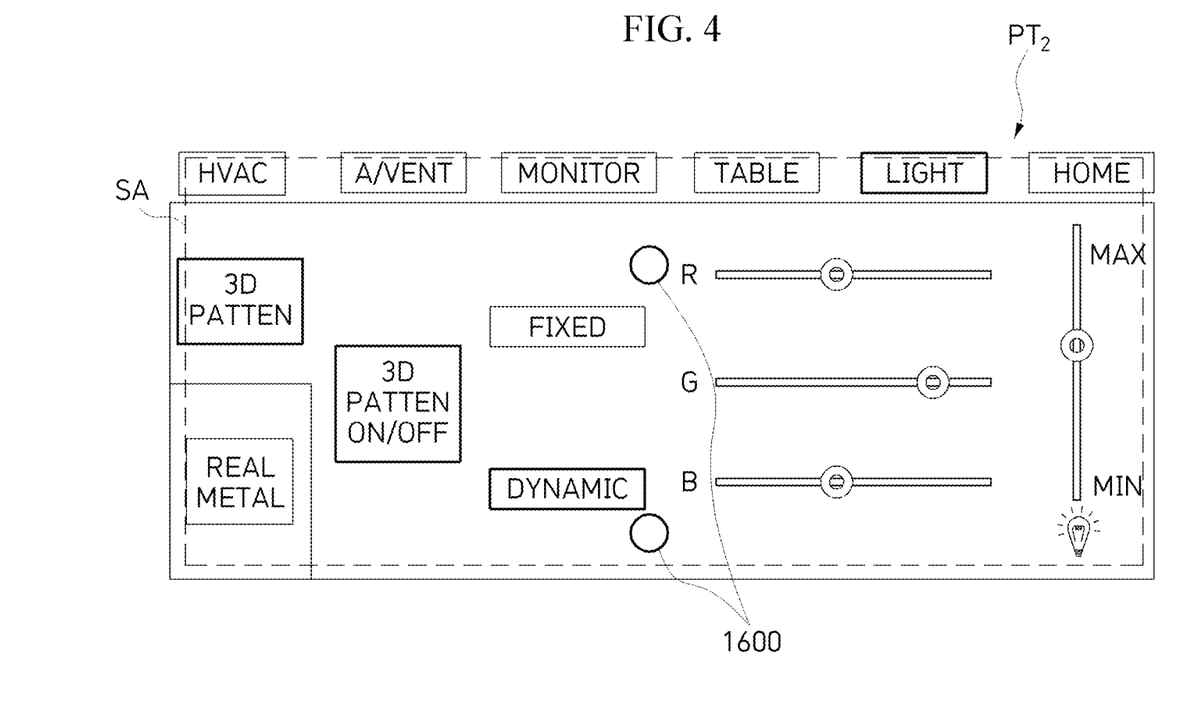

For example, when the driver or passenger selects LIGHT among the symbols projected on the lower garnish 630 through the projection 1200, as illustrated in FIG. 4, control interface information corresponding to the symbol selected by the driver or passenger (a 3D PATTERN menu button symbol and a subordinate interface thereof (3D PATTERN on/off, Fixed/Dynamic, a R control bar, a G control bar, a B control bar, and a brightness control bar), and a REAL METAL menu button symbol) are displayed on the lower garnish 630.

Meanwhile, the projection switching device according to the first embodiment of the present invention may correct an erroneous touch due to projected symbol information.

Since the projection 1200 according to the first embodiment of the present invention is installed in the upper dashboard of the vehicle, a variation in the projection area of the projection 1200 due to an initial assembly error or vibration of the vehicle inevitably occurs.

Thus, the projection switching device according to the first embodiment of the present invention further includes the reference position providing portion 1500 configured to project a position correcting symbol on the lower garnish 630 to correct a variation in the projection area of the projection 1200, and the controller 1400 may allow the user to adjust a variation in a projected image using a keystone adjustment function of the projection 1200.

Figure 5:
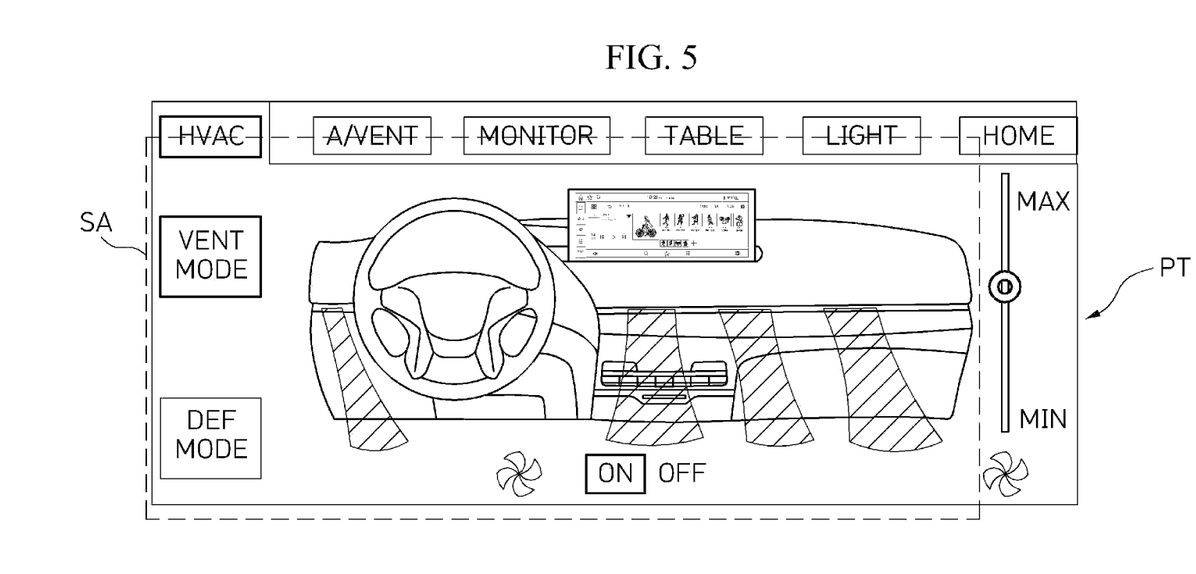

FIG. 5 is a view illustrating a state in which a symbol is abnormally projected through the projection 1200. As illustrated in FIG. 5, a variation may occur between a symbol PT projected through the projection 1200 and a recognition area SA of the touch sensor 1300 disposed on the lower portion of the lower garnish.

Figure 6:
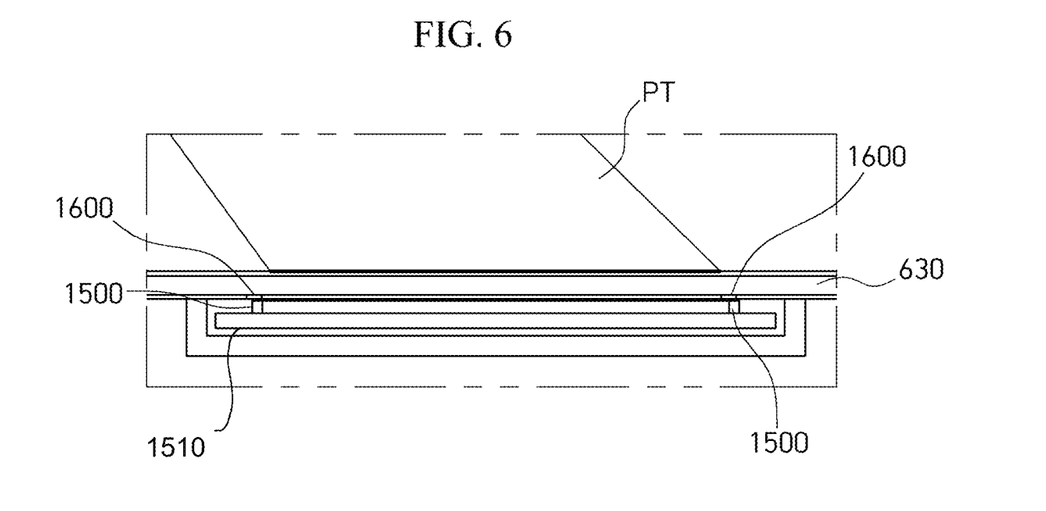

Thus, in order to adjust the variation between the projected image that is projected through the projection 1200 and the recognition area of the touch sensor, as illustrated in FIG. 6, a light transmitting area is disposed at one side of the lower garnish 630, e.g., a position correcting symbol is displayed on the lower garnish 630 through the backlight at a lower portion.

Figure 7:
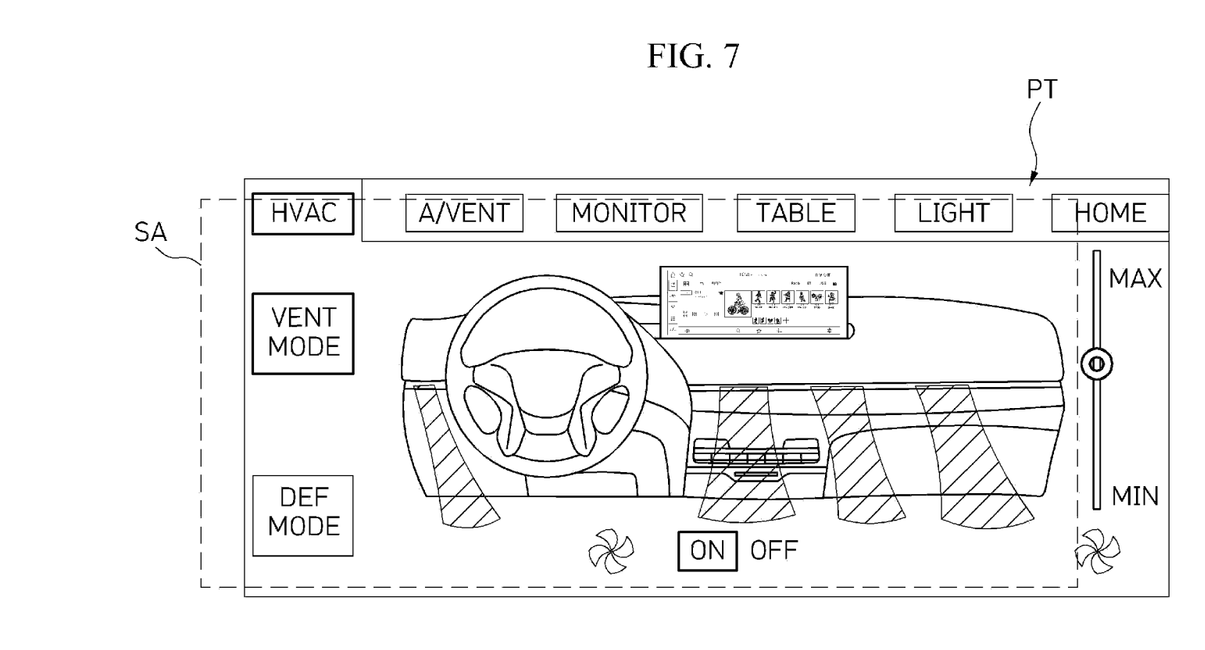
FIGS. 7 to 10 are reference diagrams for describing a variation adjustment process in the projection switching device according to an embodiment.

Then, as illustrated in FIG. 7, a variation may occur between the area PT of the projected image that is projected from the projection 1200 and the area SA of the touch sensor 1300 that is disposed on the lower portion of the lower garnish 630.

Thus, the driver switches to a variation adjustment mode to correct the position of the projected image output from the projection 1200.

Figure 8:
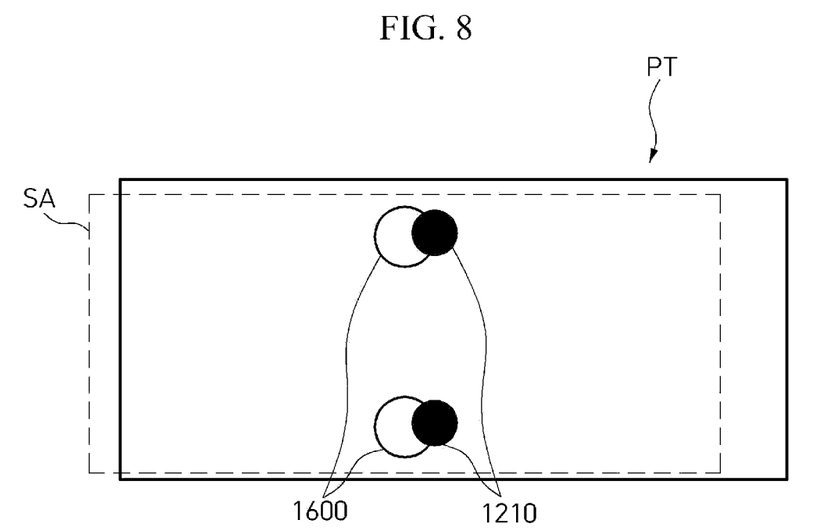

Then, as illustrated in FIG. 8, a position correcting symbol 1600 is output on the light transmitting area on the lower garnish 630, and a correcting symbol 1210 is projected on the lower garnish 630 through the projection 1200. Thus, the driver may check an error in an image through the two symbols 1600 and 1210.

Figure 9:
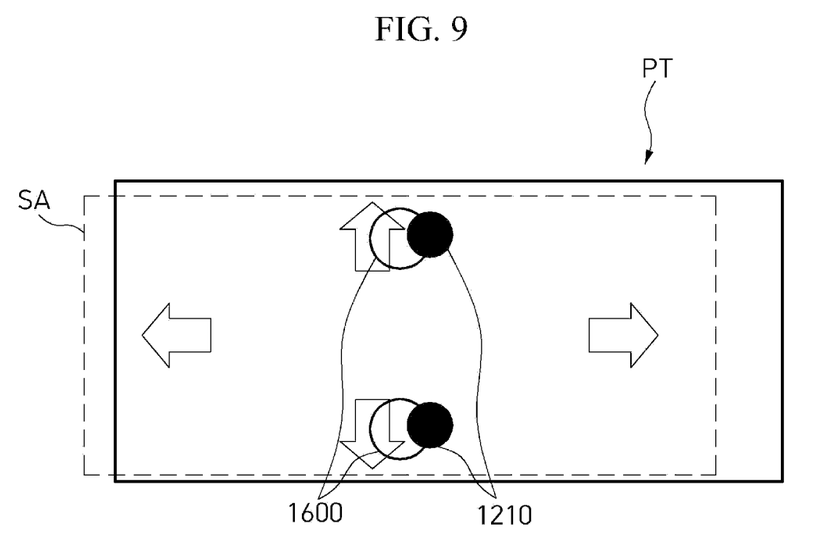

Then, in order to adjust a variation in a projected image that is projected through the projection 1200, the driver may select top, bottom, left, and right arrow symbols 1600, which are displayed in the light transmitting area, to, as illustrated in FIG. 9, adjust the position of the projected image of the projection 1200.

Figure 10:
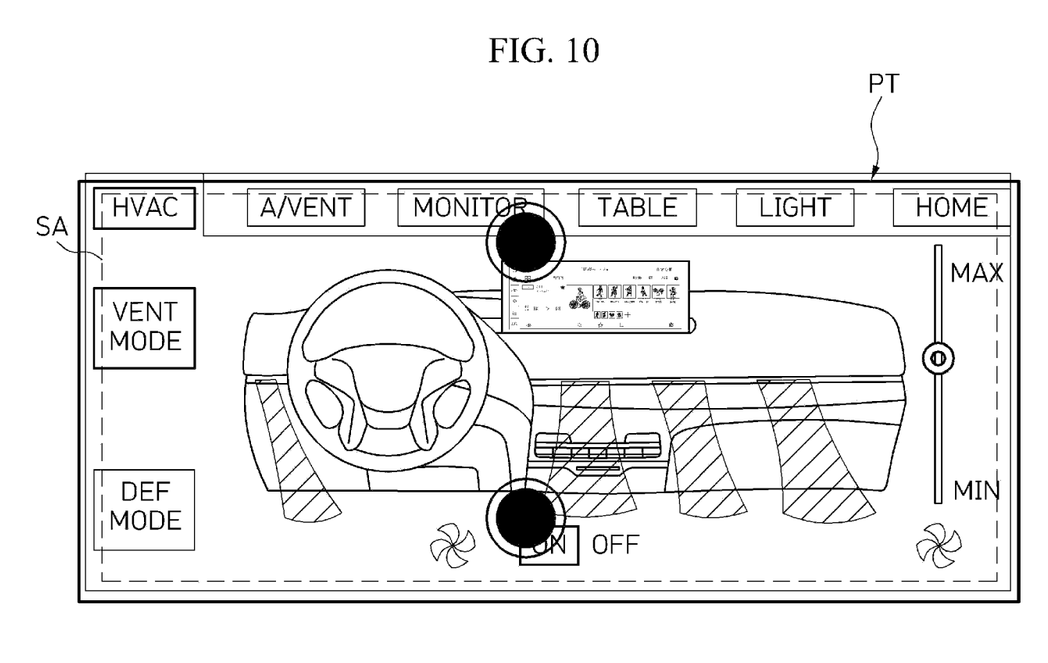

After the variation in the position of the projected image projected from the projection 1200 is completely corrected, as illustrated in FIG. 10, a switching symbol of the vehicle is projected through the projection 1200. Here, a method of completing the position correction mode may be implemented in various ways. For example, all the symbols for position correction of the projected image may be selected to complete the position correction mode, or a separate "complete" button may be output and the button may be selected to complete the position correction mode.

The projection switching device according to the first embodiment of the present invention may be independently provided or provided at an outer side of a range in which a connection frame 500 connected to a monitor slides according to a first embodiment to a third embodiment.

As described above, by implementing a projection-type switch, it is possible to improve usability of a device and reduce an error rate of the device through position correction.

As described above, according to an example, here is provided a projection switching device capable of securing a degree of freedom of surface treatment on a switch disposed in a dashboard of a vehicle and diversifying implemented images.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A projection switching device, comprising:
   a projector configured to project images on a lower garnish;
   the lower garnish configured to cover a lower dashboard and to display the images projected from the projector;
   touch sensors disposed on a lower portion of the lower garnish to sense a touch of a user;
   a reference position provider configured to display a position correcting symbol on the lower garnish through a backlight in a variation adjustment mode; and
   a controller configured to:
   output, by the projector, the images including control options,
   receive control information corresponding to symbol information among the control options ata position where the touch has occurred in response to the touch being sensed by the touch sensors,
   switch to the variation adjustment mode for position correction of a projected image responsive to a detection of a variation of a position of the control options and the touch sensors on the lower garnish,
   wherein, in the variation adjustment mode the controller is further configured to:
   illuminate, by the reference position provider, the position correcting symbol responsive to the variation,
   project, by the projector, a correcting symbol for position correction on to the position correcting symbol on the lower garnish,
   adjust a position of the projected image according to a difference between the position correcting symbol and the correcting symbol;
   adjust a variation in the projected image using a keystone adjustment function of the projector according to the difference to correct the variation of the position of the control options and the touch sensors on the lower garnish, and
   enable the position of the projected image to be adjusted according to the touch of the user.

2. The projection switching device of claim 1, wherein the projector is disposed at an inner side of an upper dashboard.

3. The projection switching device of claim 2, wherein the projector is further configured to not be exposed to a gaze of the user.

4. The projection switching device of claim 1, wherein the reference position provider comprises a projection area disposed at a side of the lower garnish.

5. The projection switching device of claim 1, wherein the reference position provider is further configured to display the position correcting symbol through a light emitting diode (LED) disposed on the lower garnish.

6. The projection switching device of claim 1, wherein the touch sensors constitute a single touchpad comprising a plurality of touch areas.

7. The projection switching device of claim 1, wherein the difference between the position correcting symbol and the correcting symbol is based on the touch of the user.

8. The projection switching device of claim 7, wherein the controller is further configured to adjust the position of the projected image based on any one or any combination of top, bottom, left, or right arrow symbols selected by the user.

9. A control device, comprising:
a lower garnish configured to cover a lower dashboard;
a projector configured to project symbols on the lower garnish in a projection area;
touch sensors disposed on a lower portion of the lower garnish to sense a touch of a user;
a backlight configured to display a position correcting symbol on the lower garnish while in a variation adjustment mode; and
a controller configured to:
   in a control mode, control a device associated with the controller based on inputs from the touch sensors related to control symbols of the symbols projected onto the touch sensors;
   in the variation adjustment mode for position correction of the projected symbols:
      project, by the projector, a correcting symbol for position correction on the lower garnish;
      adjust a position of a projected image according to a difference between the position correcting symbol and the correcting symbol using a keystone adjustment function of the projector to correct a mismatch between the position control symbols and the lower garnish; and
   enable the position of the projected image to be adjusted according to the touch of the user.

10. A control device, comprising:
a lower garnish configured to cover a lower dashboard;
a projector configured to project symbols on the lower garnish in a projection area;
touch sensors disposed on a lower portion of the lower garnish to sense a touch of a user;
a backlight configured to display a position correcting symbol on the lower garnish; and
a controller configured to:
   in a control mode, control a device associated with the controller based on control inputs from the touch sensors related to the symbols projected onto the touch sensors;
   in a variation adjustment mode for position correction of the projected symbols:
      illuminate the backlight;
      project, by the projector, a correcting symbol for position correction on the backlight;
      project, by the projector, image adjustment symbols on the lower garnish;
      receive difference information based on correction inputs from touch sensors related to the image adjustment symbols;
      adjust a position of a projected image according to the difference information using a keystone adjustment function of the projector to correct a mismatch between the position correcting symbol and the correcting symbol; and
   enable the position of the projected image to be adjusted according to the touch of the user.

\* \* \* \* \*